May 25, 1965  D. W. WALKER  3,185,413
INTEGRAL TENSION BAR RETAINER
Filed March 25, 1963  2 Sheets-Sheet 1
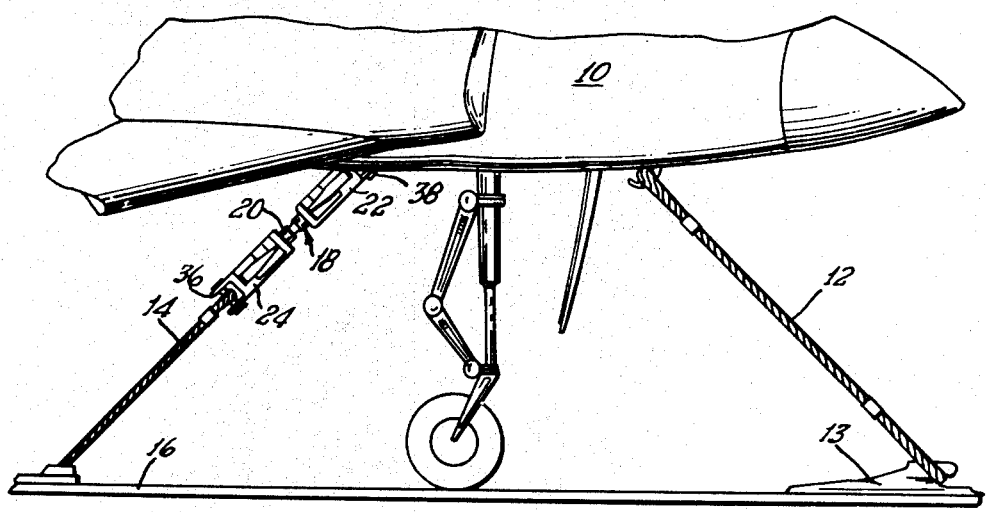
INVENTOR.
DALE W. WALKER
BY
Arthur L. Collins
ATTORNEY

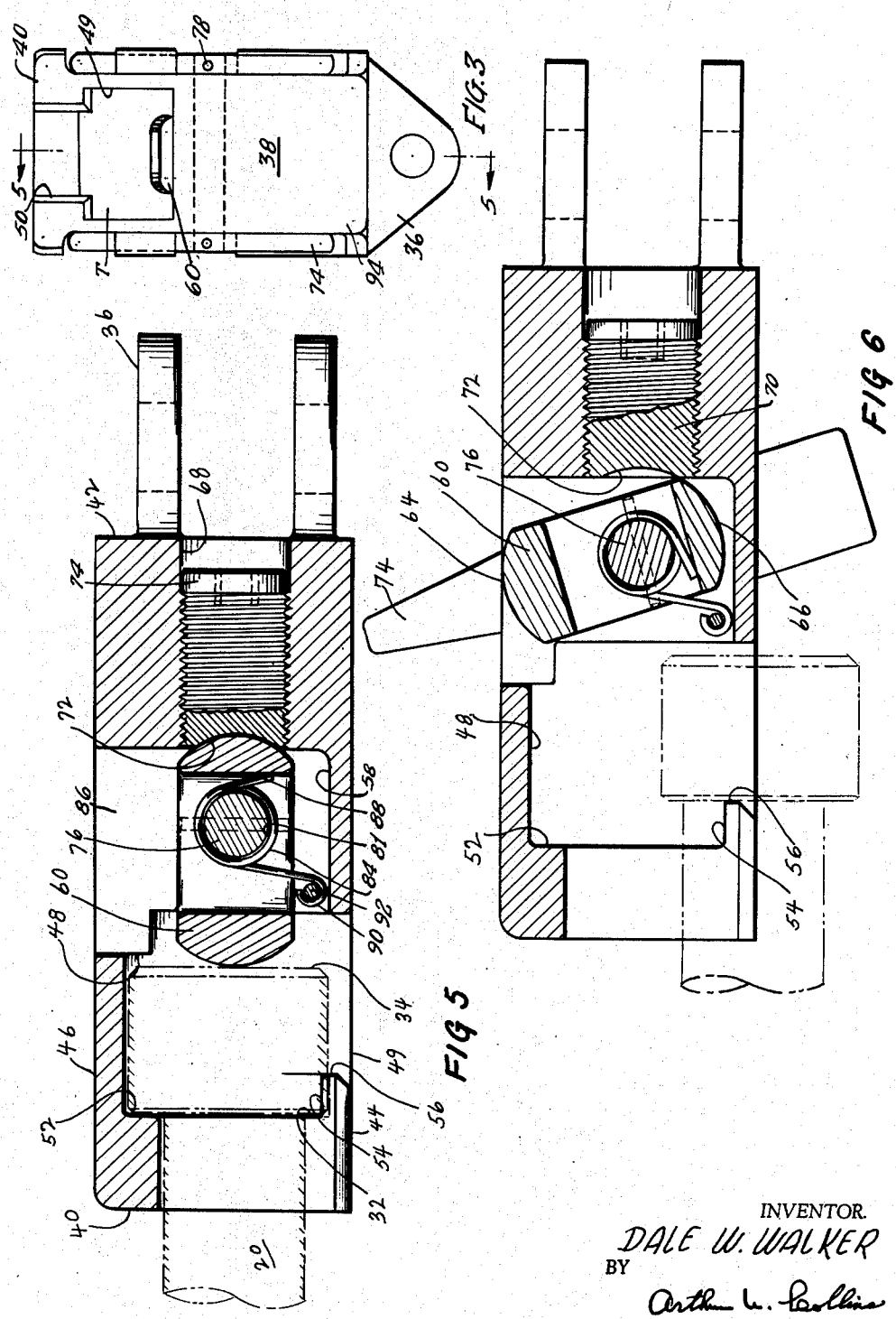

3,185,413
INTEGRAL TENSION BAR RETAINER

Dale W. Walker, Springfield, Pa., assignor to the United States of America as represented by the Secretary of the Navy
Filed Mar. 25, 1963, Ser. No. 267,867
1 Claim. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft catapult launching devices and particularly to holdback couplers used in such device.

In the preparatory stages of catapult launching, the aircraft is positioned over the catapult shuttle and secured to it by a tow cable. Full catapult launching power is assured by temporarily restraining the aircraft with a holdback that secures it to the take-off surface. When full catapult power is reached, the holdback is released and the aircraft catapulted forward. Release of the holdback is achieved by rupture or parting a shear pin through which it is connected. Frequently injuries have resulted from the pieces of the shear pin flying through the launching area; furthermore, aircraft have been released prematurely through disconnecting an improperly positioned shear pin without its being sheared.

It is, accordingly, an object of this invention to provide a shear pin coupler for a catapult holdback which will retain the shear pin pieces; which readily permits easy coupling to a shear pin with proper positioning of the shear pin being assured; which has means for preventing unintentional disconnecting from a shear pin; which has means for indicating an improper connection; which has protective features to safeguard movable parts of the coupler; and which is relatively economical to manufacture and has a rugged construction.

The invention possesses other objects and features of value, some of which will be set forth in the following description of the invention and will be more apparent when the description is read in light of the accompanying drawing wherein, FIG. 1 is a side elevation view of part of an aircraft shown hooked to a shuttle in preparation of a launch and restrained by the holdback of the invention;

FIG. 2 is a perspective view of a coupler and shear pin removed therefrom;

FIG. 3 is a top plan view of a coupler;

FIG. 4 is a bottom view of a coupler;

FIG. 5 is a longitudinal sectional view through a coupler, as along line 5—5 of FIG. 3, with a shear pin in the coupler and locked in position and the coupler turned over so that the bottom side is directed upward;

FIGURE 6 is similar to FIG. 5 except it shows the coupler in the unlocked position and the shear pin not seated fully in the coupler socket.

In a broad way, the invention includes a female member adapted to receive a flanged-like male member. An actuator, which has a lever that operates a cam or retainer, locks the male member against its removal.

Referring to the drawing, in FIG. 1, 10 represents an aircraft connected by a tow cable 12 to a catapult shuttle 13 in preparation for a launch. A holdback restraint 14, such as a cable or rod, has one end secured to the take-off surface 16 by some means as an eye bolt and is joined at its other end by a connector 18 to the aircraft. The holdback restrains the forward motion of the aircraft until a frangible tensile element or shear pin 20 in the connector is separated.

Connector 18 comprises two couplers, 22 and 24, and the shear pin 20 which they hold between them. Shear pin 20 has a hollow cylindrical body 26 with a circumferential groove 28 in the center of its outer surface and enlarged cylindrical heads or flanges, 30, at its ends. Each head 30 has an annular forward face 32 and a disk like rearward face 34. Under excessive strain, shear pin 20 separates at the groove 28 in two.

One of the couplers, 22, has a bifurcation 36 with a bolt 38 passing through it that connects it to the underside of the fuselage of the aircraft 10. The other coupler, 24, has a similar bifurcation 36' or some other means by which it is joined to the end of the holdback cable. Otherwise, couplers 22 and 24 are similar and, therefore, only one of them will be described.

Each coupler has a body 38 of rectangular shape with a forward end 40, a rearward end 42, top surface 44 and bottom 46. The bifurcation, heretofore referred to, extends from the rearward end 42.

In the forward part of the coupler body 38, its top surface 44 and forward end 40 are penetrated by a T-shaped recess or socket, T, designed to receive a head 30 and a part of the shear pin body 26 so that it is positioned below the coupler body's top surface 44 and extends through the forward end 40. The bar part of the socket, T, is a cavity 48 within the coupler body. It has a rectangular opening 49 in the top surface 44 which is suited to pass a shear pin head 30 into the cavity 48. The cavity 48 extends forwardly under the top surface so that it is longer than its opening 49, and also longer than the shear pin head 30. The leg of the socket is a channel 50 that extends through the top surface 44 and forward end surface 40, and it is sized to receive only the shear pin body 26, that is the portion between the heads 30. By this construction, shoulders 52, 54, and 56 are formed between the bar and leg portions of the socket in the coupler body.

A shear pin 20 is positioned in the coupler body by disposing it over the socket so that the pin's and coupler body's axes are parallel and the pin body 26 is over the leg, 50, part of the socket. The shear pin is then moved transversely into the socket and axially forward until the annular face 32 of the shear pin abuts shoulder or stop 52 in the coupler body. When so positioned, a portion of the shear pin head 30 is under the overhead shoulder 54 in the coupler body and the pin cannot be removed with its transverse motion alone. Removal of the pin requires its movement axially rearward and then transversely outward.

Provision is made to hold the shear pin in the forward position described above, and, thus, retain or lock it within the coupler body as desired. In this regard, the bottom 46 of the coupler body, FIG. 4, has a rectangular hole 58 which intersects the rearward wall of cavity 48. A retainer or cam 60 having rectangular sides 62 and curved ends 64 and 66 is disposed within hole 58. When the retainer 60 is positioned so that the long axes of its sides 62 are parallel to the coupler body axis, that is, horizontally, a portion of retainer 60 extends into cavity 48 and its forward end 64 contacts the rearward end 34 of the shear pin 20, if it is fully seated; whereas, when the retainer 60 is rotated 90°, that is, to a vertical position with its forward end pointing downward, no portion of the retainer 60 projects into cavity 48. Consequently, the shear pin 20 is in an unlocked position and free to be removed from the coupler socket in the manner hereinbefore described.

In the rearward end 42 of the coupler body 38 between the projections forming the bifurcation 36, there is a threaded hole 68 that extends axially into the retainer hole 58. A plug 70 is screwed into hole 68 which has a concave forward end 72 adapted to provide a seat for the rounded rearward end 66 of retainer 60. As a result, with shear pin 20 positioned properly in the coupler socket, and retainer 60 in a horizontal or locked position, there are no gaps between the forward shoulder 52 in the coupler body and the plug's concave face 72. That is, the rearward face 66 of the retainer 60 is seated in the plug 70, the forward end 64 of the retainer abuts the rearward end 34 of the shear pin, and the annular forward face 32 of the shear pin seats on the shoulder 52 in the socket. All parts are axially aligned in end abutting relationship. Although axial motion of the shear pin is eliminated, nevertheless, because of the curvatures on the ends of retainer 60 and plug 70, the retainer can be rotated so as to unlock the shear pin 20 for axial movement.

Rotation of retainer 60 is possible by turning one of the levers 74 situated on each side of the coupler body 38. The levers are flat rods that have their axes parallel to the coupler body, when the shear pin is in the locked position, and are fixed to the ends of an axle 76 that passes through the coupler body and retainer 60. Screws or rivets 78 secure the levers 74 and the retainer 60 to the axle 76 for rotation with the axle. The length of levers 74 is such that it projects above the top and bottom surfaces of the coupler body 38 when they are rotated to unlock the shear pin 20, as shown in FIG. 6. This permits ready observation of the unlocked position; however, as a further aid, a horizontal line 80 is painted with a luminescent paint, for instance, red, on each side of the coupler body (FIG. 2). The paint lines 80 are covered by the levers 74 when they are horizontally disposed, that is when the shear pin 20 is locked. Any lever positions other than horizontal, as would occur when the shear pin is not completely within the socket and its annular face 32 abuts the shoulder 56 instead of stop 52, a portion of the painted line 80 is visible, and from either side of the coupler.

Levers 74 are normally urged to assume their horizontal position by a spring 84 mounted on axle 76 in a cavity 86 in the retainer 60. One end 88 of the spring reacts against the retainer, while its other end 90 is secured to the coupler body 38 through a shaft 92 in the cam hole 58.

A stop 94 is furnished on each side of the coupler body to limit the rotation of the levers 74. There are three other projections 95, 96 and 97 (FIG. 2) on each side of the coupler body. Each of these, together with stop 94, are shaped and positioned to protect the levers 74 against being snagged which may occur in the event the coupler is dragged over a surface.

The operation of the device is believed to be apparent from the foregoing. Briefly, however, to position a shear pin 20 in the socket of a coupler body 38, the lever 74 is moved to a vertical position (FIG. 6). This rotates retainer 60 so that its forward end 64 is clear of socket cavity 48. A shear pin 20 is then positoned into cavity 48 and moved forward until the pin's forward annular face 32 abuts the stop 52. Lever 74 is then moved to a horizontal position to lock the shear pin in position. Removal of the shear pin is achieved by reversing the operation.

In the locked position, all parts are in end abutting relationship. In situations where a rod instead of a holdback cable is used, there is a tendency at times to shift the shear pin rearward. Because of the end abutting relationship, however, the strain is on the coupler body and little of it is on axle 76. Consequently, there is little possibility of damage to the actuating mechanism in the invention.

Obviously many modifications and variations of the present invention are possible in light of the above teaching. It is therefore understood that within the scope of of the appended claim the invention may be practiced otherwise than as specifically described.

What is claimed is:

A breakaway device for securing a first member to a second member until a predetermined tensile force is applied to separate said members, said device comprising:

(a) a first terminal which has an aperture that extends inwardly from one end and which is secured at its other end to the first member;

(b) a second terminal which has an aperture that extends inwardly from one end and which is secured at its other end to the second member, the aperture in each said terminal having a reduced outer diameter and an enlarged inner diameter, each said terminal having a T-shaped slot through a wall that defines the apertured end of the terminal, the upright leg of each T-shaped slot having a width substantially equal to the reduced diameter of the aperture in each terminal and extending from the said one end of its associated terminal beyond the point at which the diameter of the aperture becomes enlarged, the cross arm of the T-shaped slot having a length substantially equal to the enlarged diameter of the aperture in each terminal;

(c) a shear pin having enlarged flanged extremities, the diameter of the intermediate body portion of the shear pin being substantially equal to the reduced diameter of the aperture in each terminal, the diameter of the flanged extremities of the shear pin being substantially equal to the enlarged diameter of the aperture in each terminal, said shear pin also having an annular groove in its intermediate body portion which determines the tensile force required to shear the pin;

(d) a retainer rotatably mounted in each terminal on an axis transverse to the axis of the aperture therein, each said retainer being disposed within its associated terminal so that in one rotational position when one end of the shear pin is inserted in the aperture of the terminal, the retainer engages the end of the shear pin and locks it in the terminal and in a second rotational position, the retainer permits insertion and removal of the shear pin from the terminal;

(e) lever means which is connected to each retainer and is operable externally of its associated terminal, said lever means being adapted to be disposed in parallel alignment with the axis of the aperture in the terminal when the shear pin is locked in the terminal and transverse to the axis of the aperture when the shear pin can be inserted or removed from the terminal; and (f) marking means on the exterior surface of each terminal which is concealed from view only when the retainer on its associated terminal occupies its locked rotational position.

References Cited by the Examiner

UNITED STATES PATENTS

| | | | |
|---|---|---|---|
| 1,453,138 | 4/23 | Holliday | 24—123.1 |
| 1,460,808 | 7/23 | Wirkkala | 24—123.1 |
| 1,587,678 | 6/26 | Remington | 24—123.1 |
| 1,734,610 | 11/29 | Banks | 24—123.1 |
| 1,803,401 | 5/31 | Nadeau | 24—123.1 |
| 2,404,963 | 7/46 | Jones et al. | 244—63 |
| 2,853,257 | 9/58 | Cook | 244—110 |
| 2,942,805 | 6/60 | Zimnoch | 244—63 |

FOREIGN PATENTS

| | | |
|---|---|---|
| 37,578 | 7/23 | Norway. |
| 799,789 | 4/36 | France. |
| 1,032,106 | 6/58 | Germany. |

FERGUS S. MIDDLETON, *Primary Examiner.*

ANDREW H. FARRELL, *Examiner.*